Figure 1:
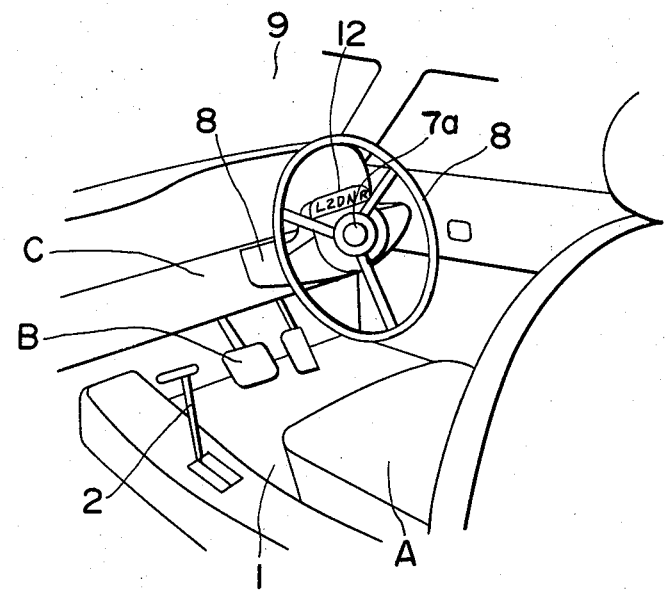

United States Patent [19]
Nishikawa et al.

[11] 3,804,055
[45] Apr. 16, 1974

[54] FLOOR-TYPE GEAR-SHIFT LEVER POSITION INDICATION ARRANGEMENT FOR USE IN A MOTOR-VEHICLE

[75] Inventors: Takehiko Nishikawa, Inazawa; Shinya Ito; Yasuhiko Ibuka, both of Aichi-ken, all of Japan

[73] Assignee: Kabushiki Kaisha Tokai Rika Denki Seisakusho, Aichi-ken, Japan

[22] Filed: Mar. 2, 1973

[21] Appl. No.: 337,578

[30] Foreign Application Priority Data
Mar. 3, 1972 Japan.............................. 47-22084

[52] U.S. Cl. ..................... 116/124 R, 74/473 R
[51] Int. Cl. ............................................. G09f 9/00
[58] Field of Search....... 116/124 R, 133; 74/473 R, 74/473 P, 475, 497, 25, 53, 54, 55, 56, 89

[56] References Cited
UNITED STATES PATENTS

| | | | |
|---|---|---|---|
| 2,869,506 | 1/1959 | Grady | 116/124 R |
| 3,050,028 | 8/1962 | Griffen et al. | 116/124 R |
| 3,326,315 | 6/1967 | Richards | 74/473 X |
| 3,550,551 | 12/1970 | Miller | 116/124 R |

Primary Examiner—Louis J. Capozi
Attorney, Agent, or Firm—Craig & Antonelli

[57] ABSTRACT

An arrangement for indicating the position of a floor-type shift lever in a motor vehicle in which a floor-type shift lever position indication is given at a position which is just beyond the steering wheel and therefore easily observed as a conventional steering-column shift lever position indication means.

10 Claims, 7 Drawing Figures

FLOOR-TYPE GEAR-SHIFT LEVER POSITION INDICATION ARRANGEMENT FOR USE IN A MOTOR-VEHICLE

The present invention relates to a floor-type gear-shift lever position indication means for use in a motor-vehicle and, more particularly, in an automobile, truck, or similar vehicle fitted with a floor-type gear-shift lever, to a means for indication of a floor-type shift lever position, which is provided around a motor-vehicle steering column, whereby a driver is given an easily-seen indication of the position to which a floor-type gear-shift level has been moved.

In automobiles and similar vehicles there are conventionally two basic positions wherein in gear-shift lever may be provided. One position is in and projecting from a housing around the steering column, and the other position is in and projecting from the floor-board in the driving compartment, by driving compartment being meant that area in which the driver of a vehicle is seated and carries out the necessary operations relating to the driving of the vehicle. The basic principles of lever action, whether of floor-type shift levers or of steering-column shift lever, are generally the same, although there are, of course, many inventive refinements relating to both types of lever. The steering-column shift lever is mounted on a steering column housing and behind the steering-wheel, that is, it is directly in front of the driver of a vehicle. Adjacent to the gear lever there is generally provided some form of visual indication by which it may be known to what position the gear lever has been moved. This visual indication is marked with as many different divisions as there are gear-changes provided in a vehicle, and may be markings on the shift lever housing or in any other suitable form, an example of such markings being P for parking, R for reverse gear, N for neutral gear, 1 for first gear, 2 for second gear and 3 for third gear; in all cases however, being immediately adjacent to the shift lever, the indication is in front of the driver, and thus the driver is given a direct indication of which position the gear shift lever has been moved to, that is the gear that has been selected. But with floor-type shift levers indication of gear lever position, is conventionally disposed on the floorboard adjacent to and around the lever; in other words the gear-shift indication is out of the normal line of sight of a driver. This presents the disadvantage, that in order to check the gear-lever position while driving a vehicle a driver must look away from the road, which is obviously undesirable from the point of view of safety driving.

It is accordingly an object of the present invention to provide an improved means for indication of a floor-type shift lever position said improved indication means being as directly visible as a conventional steering-column shift lever position indication means.

In accomplishing this and other objects there is provided according to the present invention a dial possessing markings indicative of gear-shift lever positions, provided on columnar housing mounted around a steering column and also possessing and indicating needle which is controlled by means of connection through a wire or similar element to a floor-type shift lever and is moved in response to shift lever movement in such a manner that it indicates shift lever positions on siad dial.

Figure 2:
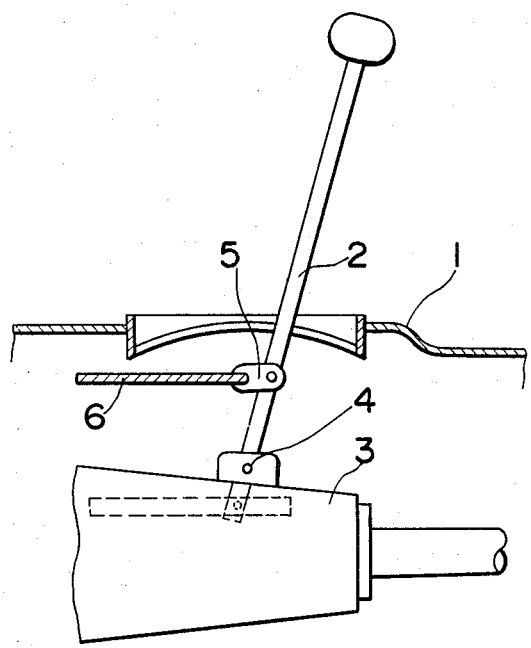
Figure 3:
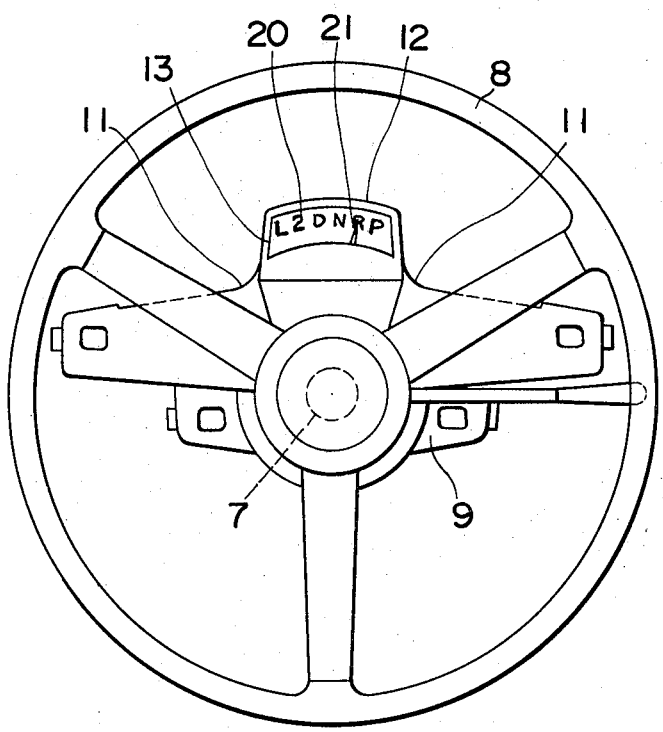
Figure 4:
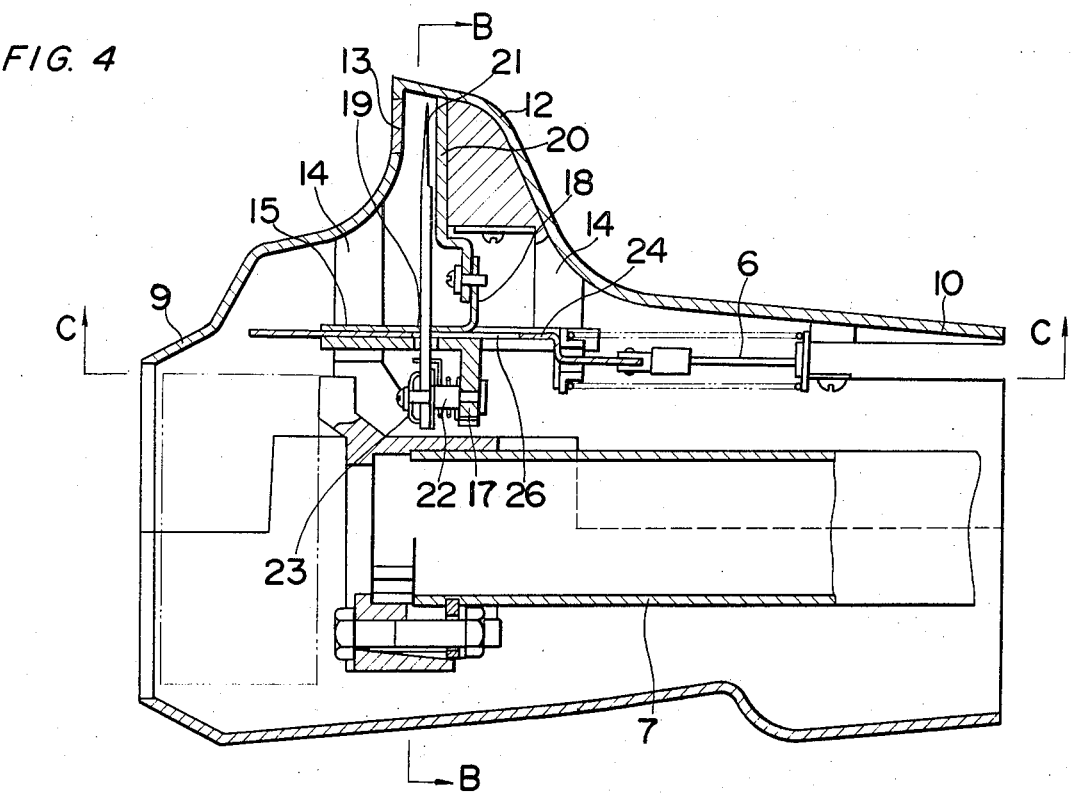
Figure 5:
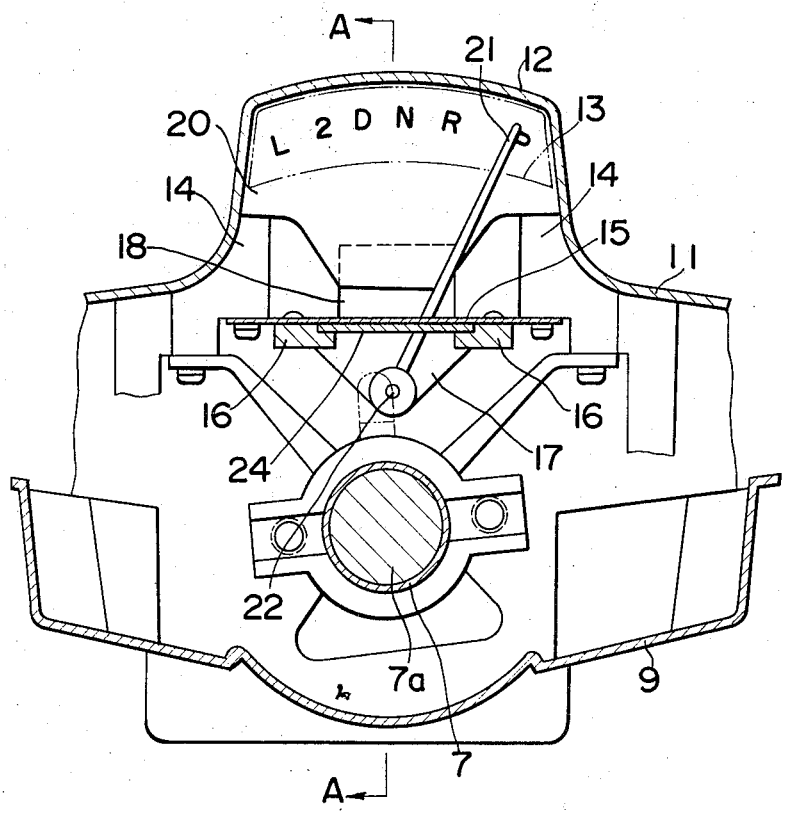
Figure 6:
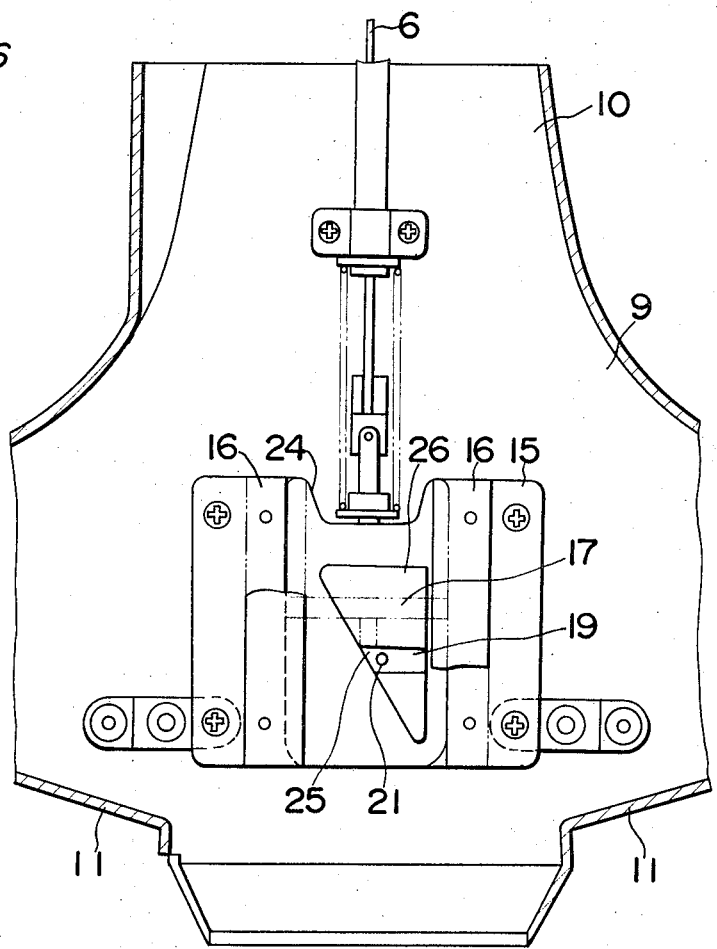
Figure 7:
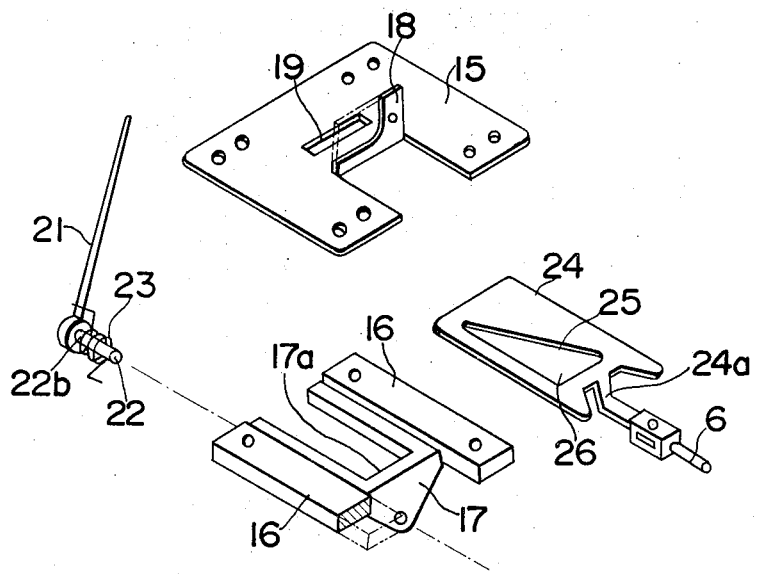

Theses and other objects and features of the present invention will become apparent from the following description taken in conjunction with one preferred example with reference to the accompanying drawings, in which;

FIG. 1 is a perspective view showing a front portion of a driving room of a motor-vehicle provided with a floor gear-shift lever position indication means according to one preferred embodiment of the present invention, FIG. 2 is a partially cross-sectional view showing a floor-type shift lever of FIG. 1, FIG. 3 is a front view of a columnar housing of FIG. 1, FIG. 4 is a longitudinal cross sectional view of the columnar housing through the line of A—A in FIG. 5, FIG. 5 is a cross sectional view taken along the line of B—B in FIG. 4, FIG. 6 is a cross sectional view taken along the line of C—C in FIG. 4, and FIG. 7 is an exploded perspective view showing parts of an indicator needle assembly of FIG. 4.

Referring first to FIG. 1, in a driving room of a motor-vehicle, there is provided a gear shift lever 2 on a floor-board 1, a vehicle steering wheel 8 in front of a driver's seat A and pedals B below a vehicle dashboard C. Passing through the floorboard 1 there is the gear-shift lever 2, which projects above the floorboard 1 for manipulation by a driver, and which below the floor-board 1 connects through a pivoting shaft 4 to a speed-change gear box 3 through which drive from the vehicle engine through a transmission shaft to vehicle wheels is provided, ratios between engine crankshaft speed and transmission shaft speed being dependent at any time on the gear assembly in mesh within the gear-box 3, and selection of gear assemblies being determined by manual operation of the gearshift lever 2, which can be moved to obtain gear assembly meshing to provide transmissions that are for example, parking (P), reverse (R), neutral (N), third gear (3), second gear (2) and first gear (1) positioned in order in connection with an automatic transmission with a torque convertor. There is also provided a floating attachment 5 which is connected to the shift lever 2 at a point on the shift lever 2 that is between the floorboard 1 and the pivoting shaft 4. One end of the wire 6 is connected to the floating attachment 5 while the other end of the wire 6 is connected to a coupling guide plate 24 which is provided in association with other elements in a columnar housing 9, described below with reference to FIGS. 3 – 7, in which it is to be noted like figures refer to like parts.

The columnar housing 9 is mounted to the lower portion of the vehicle dashboard C and is formed around the vehicle steering column 7 and behind the vehicle steering wheel 8 fixed to the outer extremity of a steering shaft 7a which is free to rotate within the column 7; the steering column 7 is covered by the housing 9. The housing 9 comprises a main cylindrical portion 10, and two lateral extension portions 11 at the steering wheel 8 end of the housing 9. Between the two lateral portions 11 the housing 9 forms a broad protrusion 12 which has a width that is approximately equal to the diameter of the main cylindrical portion 10. In profile, the protrusion 12 rises steeply at the front, that is the side of the protrusion 12 facing the steering wheel, and slopes down less steeply at the back to join the main cylindrical portion 10. At the top of the front of the protrusion 12 there is a window opening 13 covered by a glass, within which there is fixed, as described below, an indication dial 20 which possesses markings representative of different gear-shift lever positions arranged in order, for example, P, N, R, 1, 2, 3; in otherwords seen from the driver's seat A the window opening 13 and dial 20 are directly above the steering column 7 and behind the driving wheel 8. Extending in front of and behind the window opening 13, and on both sides thereof there are provided a pair of fixture pillars 14, which are fixedly attached to the inner surface of the protrusion 12 and extend vertically downwards therefrom, the ends of which are fixed on support limbs of the steering column 7. Attached to the lower portions of the fixture pillars 14 and at right-angles thereto there is a plate 15. The plate 15 forms approximately a square from one side of which a rectangular portion has been removed; at the side of the rectangle forming the removed portion that is innermost with respect to the plate 15 there is formed a mounting extension 18 which extends perpedicularly upward from the surface of the plate 15; and between this mounting extension 18 and the side of the plate 15 parallel to the side from a portion is removed, there is formed in the plate 15 and parallel to said side a guide slot 19. The plate 15 is attached to the pillars 14 in such a manner that, with respect to the protrusion 12, the slot 19 is at the front and the mounting extension 18 at the back. The above-mentioned shift lever indication dial 20 is rigidly attached to and extends vertically upwards from the mounting extension 18.

There is also provided a pair of guide slats 16, which are fixedly attached to the fixture pillars 14, on the inside thereof with respect to the outer surface of the housing 9, and on the right and left of the plate 15, the slot 19 in the plate 15 thus lying between and at right-angles to the guide slats 16. An indicator needle shaft bearing 17 is fixedly attached to the bottom of the guide slats 16. The bearing 17 for supporting an indicator needle shaft 22 is triangular in cross-section, and rotatably inserted therein there is the indicator needle shaft 22, one end of which extends slightly beyond one side 17a of the bearing 17 and is pin-fixed to prevent detachment the refrom. An indicator needle 217 is fixed at right-angles to the shaft 22 at the other end 22b of the shaft 22. On the shaft 22 between the shaft end 22b and the other side 17b of the bearing 17, there is wound a spring 23, which is also attached to the indicator needle 21, the force of the spring 23 acting to move the indicator needle 21 in one direction. The above-mentioned coupling guide plate 24, to which one end of the wire 6 is attached, is mounted in slidable attachment to the pair of guide slats 16 and more or less flush with the lower surface of the plate 15. Formed within the guide plate 24 there is a cam-guide opening 25 which is in the shape of right-angled triangle with a long side (hypoteneuse) 26, and lies below the slot 19 in the plate 15. Lengthwise, the guide plate 24 lies parallel to the longitudinal axis of the housing 9 and the cam opening long side 26 lies parallel to a long diagonal of the plate 24. There is formed an extension 24a from the plate 24 short side nearest to the housing 9 main cylindrical portion 10 (that is at the back of the protrusion 12), and to this extension 24a there is attached one end of the wire 6.

The indicator needle 21 extends upward from the shaft end 22a, through the cam opening 25 and slot 19, and the upper end thereof extends to in front of the dial 20. The force of the spring 23 on the shaft 22 keeps the needle 21 pressed against the long side 26 of the guide plate cam opening 25, and thus forward or rear movement of the guide plate 24 causes lateral movement of the indicator needle 21 while the shaft 22 turns in the bearing 17, so that the upper end of the needle 21 lies opposite different markings, 1, 2, 3, N, R, or P, on the dial 20. But forward and rear movement of the guide plate 24 is controlled in correspondence to movement of the gear shift lever 2 acting through the wire 6. In other words, in changing from, for example, 1st to 2nd gear, the gear shift lever 2 is moved in such a manner as to change the gear assembly in mesh in the gear-box 3, and thus moving the gear shift lever results in a change in the position of the guide plate 24, which in turn results in a lateral displacement of the indicator needle 21; the amount of change in the position of the guide plate 24, and hence of lateral displacement of the indicator needle 21, depends on the displacement of the gear shift lever 2, that is the dial 20 position indicated by the indicator needle 21 depends on the gear selected by means of the gear shift lever 2.

As explained above the present invention provides a means whereby a driver of a vehicle fitted with a floor-type gear shift lever is given a lever position indication which is just beyond the driving wheel and therefore easily observed. The present invention offers the advantage that it eliminates the difficulties of determining lever position that are unavoidable in conventional floor-type gear shift lever indication means.

Although the present invention has been fully disclosed by way of example, it is to be noted that various changes and modifications are apparent to those skilled in the art. For example, the indicator needle may be replaced by lamps associated with switching means which are operated in connection with the position of the gear shift lever. Accordingly such changes and modifications should be construed as included within the scope of the present invention unless otherwise departing therefrom.

We claim:

1. A transmission control and indicator arrangement for a motor vehicle provided with a steering column and a floor type gear shift lever, comprising: a housing surrounding the steering column, a dial means mounted on top and at the front of said housing, said dial means being provided with indicia corresponding to different positions of the gear shift lever, an indicator means positioned in front of said dial means and cooperating therewith for indicating the specific positions of the gear shift lever, and means for transmitting the movement of the gear shift lever to said indicator means, said transmitting means including guide plate means disposed in said housing operatively connected to said indicator means for guiding the movement of said indicator means, and connecting means disposed between said guide plate means and the gear shift lever for laterally shifting said guide plate means in a direction substantially perpendicular to said indicator means in response to a movement of the gear shift lever.

2. An indicator arrangement according to claim 1, wherein said guide plate means includes a pair of guide slats disposed in said housing, a plate slidably mounted between said guide slats, and a cam means provided on said plate cooperating with said indicator means to displace the same as the gear shift lever is moved.

3. An indicator arrangement according to claim 2, wherein a spring means is provided for biasing said indicator means into engagement with said cam means.

4. An indicator arrangement according to claim 3, wherein said cam means consists of an aperture provided in said plate.

5. An indicator arrangement according to claim 4, wherein said aperture is substantially triangular shaped.

6. An indicator arrangement according to claim 5, wherein said indicator means extends through said triangular shaped aperture and said spring means biases said indicator means against one edge of said aperture.

7. An indicator arrangement according to claim 6, wherein said indicator means is a pointer and wherein bearing means are provided between said guide slats, said pointer being mounted on a spindle rotatably supported in said bearing means.

8. An indicator arrangement according to claim 2, wherein said connecting means is a wire means and means are provided for connecting respective ends of said wire to said plate and the gear shift lever.

9. An indicator arrangement according to claim 8, wherein said cam means consists of an aperture provided in said plate.

10. An indicator arrangement according to claim 9, wherein said indicator means is a pointer and wherein bearing means are provided between said guide slats, said pointer being mounted on a spindle rotatably supported in said bearing means.

* * * * *